Patented June 21, 1927.

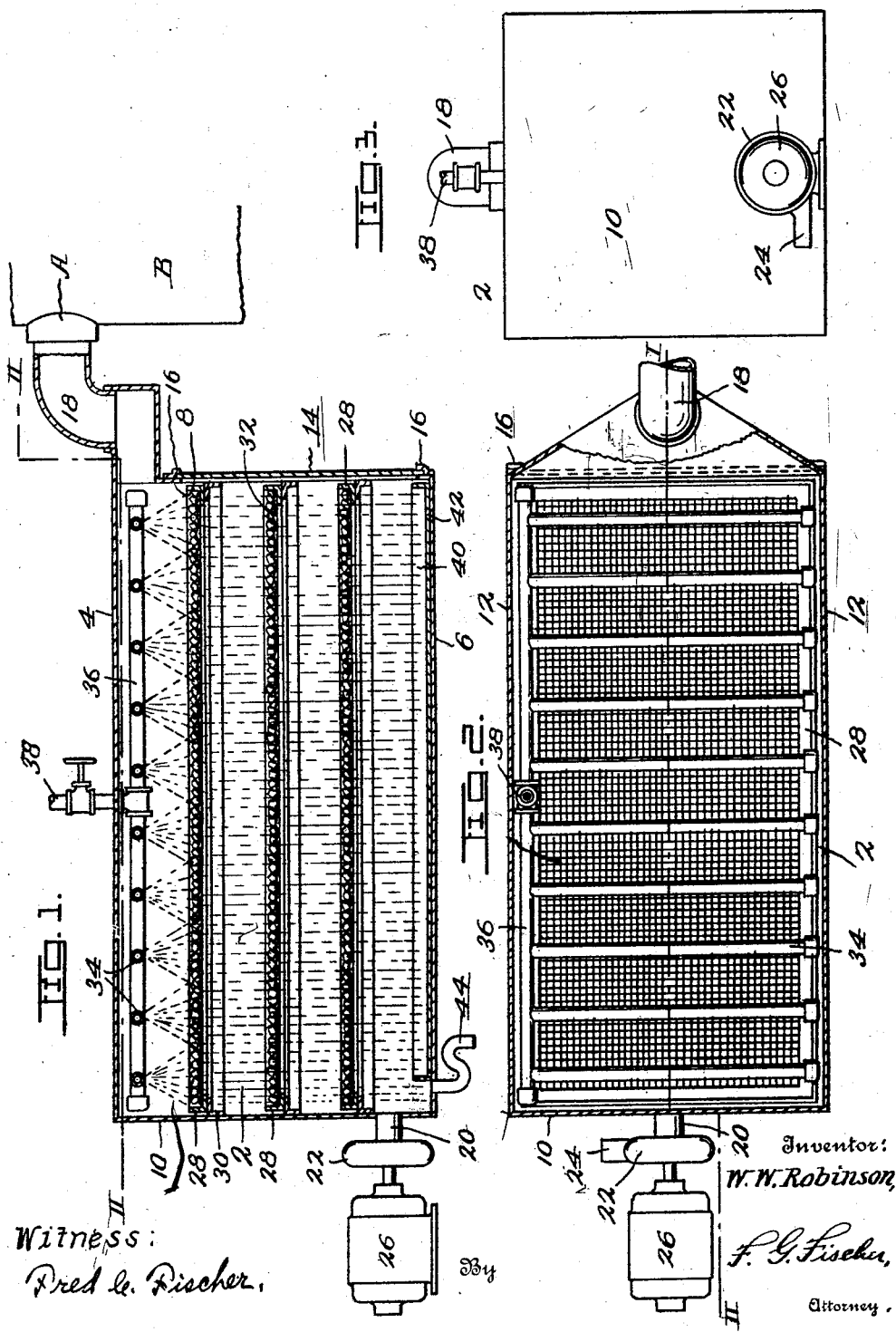

1,633,289

UNITED STATES PATENT OFFICE.

WILLIAM W. ROBINSON, OF KANSAS CITY, MISSOURI.

CONDENSER.

Application filed August 8, 1924. Serial No. 730,904.

My invention relates to condensers and my object is to provide a compact and efficient apparatus of this character which may be economically employed for a variety of purposes, such, for instance, as condensing smoke emitted by domestic and industrial furnaces, and for condensing and collecting volatilized ores which escape with the gases from ore roasting furnaces.

A further object is to provide an apparatus which will create a draft through the furnace and dispose of the gases and other products of combustion, without employing a smoke stack for that purpose.

Other objects will hereinafter appear, and in order that the invention may be fully understood reference will now be had to the accompanying drawing, in which:

Fig. 1 is a vertical longitudinal section of the apparatus on line I—I of Fig. 2.

Fig. 2 is a horizontal longitudinal section on line II—II of Fig. 1.

Fig. 3 is an end view of the apparatus.

Referring now in detail to the various parts, 2 designates a chamber which may be constructed of any suitable material such as sheet metal, masonry, etc., and embodies top and bottom walls 4 and 6, front and rear walls 8 and 10, respectively, and side walls 12. A door 14 slidably mounted in guides 16 is provided at the front of the chamber 2, so that access may be readily had to the interior thereof.

The upper front portion of the chamber 2 has an inlet pipe 18 and its rear lower portion an outlet pipe 20. The inlet pipe 18 is adapted to be connected to the flue A of a furnace B. Said furnace B may be of any well-known type such, for instance, as a heating furnace, an ore roaster, etc. The outlet pipe 20 is connected to suitable suction means such as a fan 22 having an outlet 24 and driven by an electric or other suitable motor 26.

28 designates a plurality of superimposed trays removably arranged in the chamber 2 on slides 30. The trays 28 have open mesh bottoms 32 for the passage of water discharged from spray nozzles 34 arranged in the upper portion of the chamber 2 and connected to a manifold 36, which in turn is connected to a valve-controlled supply pipe 38.

40 designates a tray removably arranged upon the bottom wall 6 of the chamber 2 and provided with a closed bottom portion 42.

44 designates a drainage trap leading from the bottom of the chamber 2 to carry off the overflow from the tray 40 without admitting air to said chamber.

When the chamber 2 is connected to a furnace used for domestic or industrial heating purposes the suction fan 22 is started up to create a draft in said furnace and through the chamber 2. As the products of combustion from the furnace enter the chamber 2 they are subjected to the spray from the nozzles 34, the spray condensing the volatilized solids in the products of combustion and precipitating them upon the trays 28 and 32. The spray also cleanses the gases of smoke and obnoxious odors so that that portion of the products of combustion which escapes through the outlet pipe 20 is both colorless and odorless. If desirable the spray may be chemically treated to render it more effective in dissipating the odors and rendering the gases harmless to animal and plant life. At intervals when the furnace is not in operation the door 14 may be opened and the trays 28 and 32 removed with their contents which may then be dried and reused for fuel.

When the chamber 2 is connected to an ore roasting furnace the trays 28 are preferably supplied with coke or some other agent having an affinity for the volatilized metals which enter the chamber 2 with the products of combustion. As the volatilized ores are precipitated by the spray they are caught by the coke to which they adhere, while the carbon forming part of the products of combustion, having little or no affinity for the coke, is carried by the spray to the bottom tray 40, so that after being dried it may be used with other fuel in the furnace. On completion of the roasting operation the trays 28 may be removed from the chamber 2 and their contents placed in a crucible in which the coke may be consumed to free the metal.

From the foregoing description it is apparent that I have provided an apparatus which will not only eliminate the smoke nuisance but will also collect for reuse carbon and other combustible solids precipitated from the products of combustion drawn from the furnace. It is also apparent that I have provided a compact and economical appliance for recovering volatilized ores which is more efficient and occupies considerable less space than the apparatus usually employed for that purpose.

While I have shown and described the preferred construction, combination and arrangement of parts, I reserve the right to make such changes as properly fall within the spirit and scope of the invention as claimed.

Having thus described my invention, what I claim and desire to secure by Letters Patent, is:

In an apparatus of the character described a chamber having an inlet at its upper portion for connection with the flue of a furnace, an outlet to said chamber near the lower portion thereof, means adjacent to the outlet for creating a draft through said chamber to draw the products of combustion from said furnace, a plurality of spray means extending across the upper portion of the chamber for precipitating therein the volatilized solids in the products of combustion, superimposed trays mounted in said chamber having openings in their bottom portions and provided with an agent having an affinity for certain of said solids, an imperforate removable tray resting upon the bottom of the chamber, and drainage means leading from said chamber.

In testimony whereof I affix my signature.

WILLIAM W. ROBINSON.